(12) United States Patent
Yamaguchi et al.

(10) Patent No.: US 11,523,047 B2
(45) Date of Patent: Dec. 6, 2022

(54) IMAGING DEVICE, IMAGING METHOD, AND PROGRAM

(71) Applicant: Sony Group Corporation, Tokyo (JP)

(72) Inventors: Tadashi Yamaguchi, Kanagawa (JP); Seijiro Inaba, Kanagawa (JP); Satoru Ishii, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/426,079

(22) PCT Filed: Jan. 30, 2020

(86) PCT No.: PCT/JP2020/003438
§ 371 (c)(1),
(2) Date: Jul. 27, 2021

(87) PCT Pub. No.: WO2020/162320
PCT Pub. Date: Aug. 13, 2020

(65) Prior Publication Data
US 2022/0103746 A1    Mar. 31, 2022

(30) Foreign Application Priority Data
Feb. 6, 2019    (JP) .............................. JP2019-019307

(51) Int. Cl.
*H04N 5/232*    (2006.01)
*G03B 17/18*    (2021.01)

(52) U.S. Cl.
CPC ......... *H04N 5/23218* (2018.08); *G03B 17/18* (2013.01); *H04N 5/232935* (2018.08)

(58) Field of Classification Search
CPC .......... G06F 17/30268; G06F 3/04883; G06F 3/0484; G06F 3/04817; G06F 3/0482; G06F 3/0412; G06F 1/1694; G06F 1/1643; H04N 5/23206; H04N 5/23216; H04N 5/23222; H04N 5/23293; G06K 9/6202
USPC ...................................... 348/231.99; 434/308
See application file for complete search history.

(56) References Cited

U.S. PATENT DOCUMENTS

| 2012/0008014 A1* | 1/2012 | Ito ..................... H04N 5/232939 |
| | | 348/E5.031 |
| 2018/0041696 A1* | 2/2018 | Balasubramanian ....................... |
| | | H04N 5/23216 |
| 2018/0249083 A1* | 8/2018 | Chi ..................... H04N 5/23293 |

(Continued)

FOREIGN PATENT DOCUMENTS

| JP | 2006-115045 A | 4/2006 |
| JP | 2012-019341 A | 1/2012 |

(Continued)

OTHER PUBLICATIONS

International Search Report (PCT/ISA/210), International Application No. PCT/JP2020/003438, dated Mar. 9, 2020.

(Continued)

*Primary Examiner* — Xi Wang
(74) *Attorney, Agent, or Firm* — Michael Best & Friedrich LLP

(57) ABSTRACT

Provided is an imaging device including: as assistant control unit that determines, on the basis of user's proficiency level information regarding imaging, an item presented to assist the imaging; and a presentation unit that presents item information, which is information regarding the item, to the user.

12 Claims, 8 Drawing Sheets

(56) References Cited

U.S. PATENT DOCUMENTS

2019/0246034 A1\* 8/2019 Watanabe ............ H04N 5/2353

FOREIGN PATENT DOCUMENTS

| JP | 2014-192743 A | 10/2014 |
|---|---|---|
| WO | 2018/229888 A1 | 12/2018 |

OTHER PUBLICATIONS

Notification of Transmittal of the International Search Report and the Written Opinion of the International Searching Authority, or the Declaration (PCT/ISA/220), International Application No. PCT/JP2020/003438, dated Mar. 24, 2020.

Written Opinion of the International Search Authority (PCT/ISA/237), International Application No. PCT/JP2020/003438, dated Mar. 24, 2020.

\* cited by examiner

IMAGING DEVICE, IMAGING METHOD, AND PROGRAM

TECHNICAL FIELD

The present disclosure relates to an imaging device, an imaging method, and a program.

BACKGROUND ART

In recent years, a technique for assisting production of imaging using various cameras (for example, a single-lens reflex camera, a digital camera, a video camera, and the like has been developed. For example, Patent Document 1 below discloses a technique capable of capturing an image with setting similar to good image capturing in a case where the good image capturing has been performed in the past and the like.

CITATION LIST

Patent Document

Patent Document 1: Japanese Patent Application Laid-Open No. 2006-115045

SUMMARY OF THE INVENTION

Problems to be Solved by the Invention

However, depending on the background art including Patent Document 1, it has not been possible to appropriately assist production of imaging on the basis of a user's proficiency level regarding the imaging. For example, production assistance functions in the background art have been often performed on a specific item of "composition", "manual setting" (setting of an imaging device during imaging, for example, setting of shutter speed, an aperture value, ISO sensitivity, exposure, white balance, and the like), and "accessory" (an article used with the imaging device during imaging, for example, a flash, a lens, a filter, and the like), or the user has had to select an item of production assistance on the basis of his/her proficiency level. Furthermore, for example, in a case where production assistance regarding "composition" is performed, a reference image presented to the user includes not only an element "composition" but also various elements such as "manual setting" and "accessory". Therefore, even if the user has captured an image with a composition matching the reference image, it has been often impossible to obtain an image similar to the reference image.

Therefore, the present disclosure has been made in view of the circumstances described above, and provides a new and improved imaging device, imaging method, and program capable of more appropriately assisting production of imaging on the basis of a user's proficiency level regarding the imaging.

Solutions to Problems

According to the present disclosure, an imaging device including: an assistant control unit that determines, on the basis of user's proficiency level information regarding imaging, an item presented to assist the imaging; and a presentation unit that presents item information, which is information regarding the item, to the user.

Furthermore, according to the present disclosure, an imaging method executed by a computer, including: determining, on the basis of user's proficiency level information regarding imaging, an item presented to assist the imaging; and presenting item information, which is information regarding the item, to the user.

Furthermore, according to the present disclosure, a program that allows a computer to execute: on the basis of user's proficiency level information regarding imaging, determination of an item presented to assist the imaging; and presentation of item information, which is information regarding the item, to the user.

MODE FOR CARRYING OUT THE INVENTION

Figure 1:
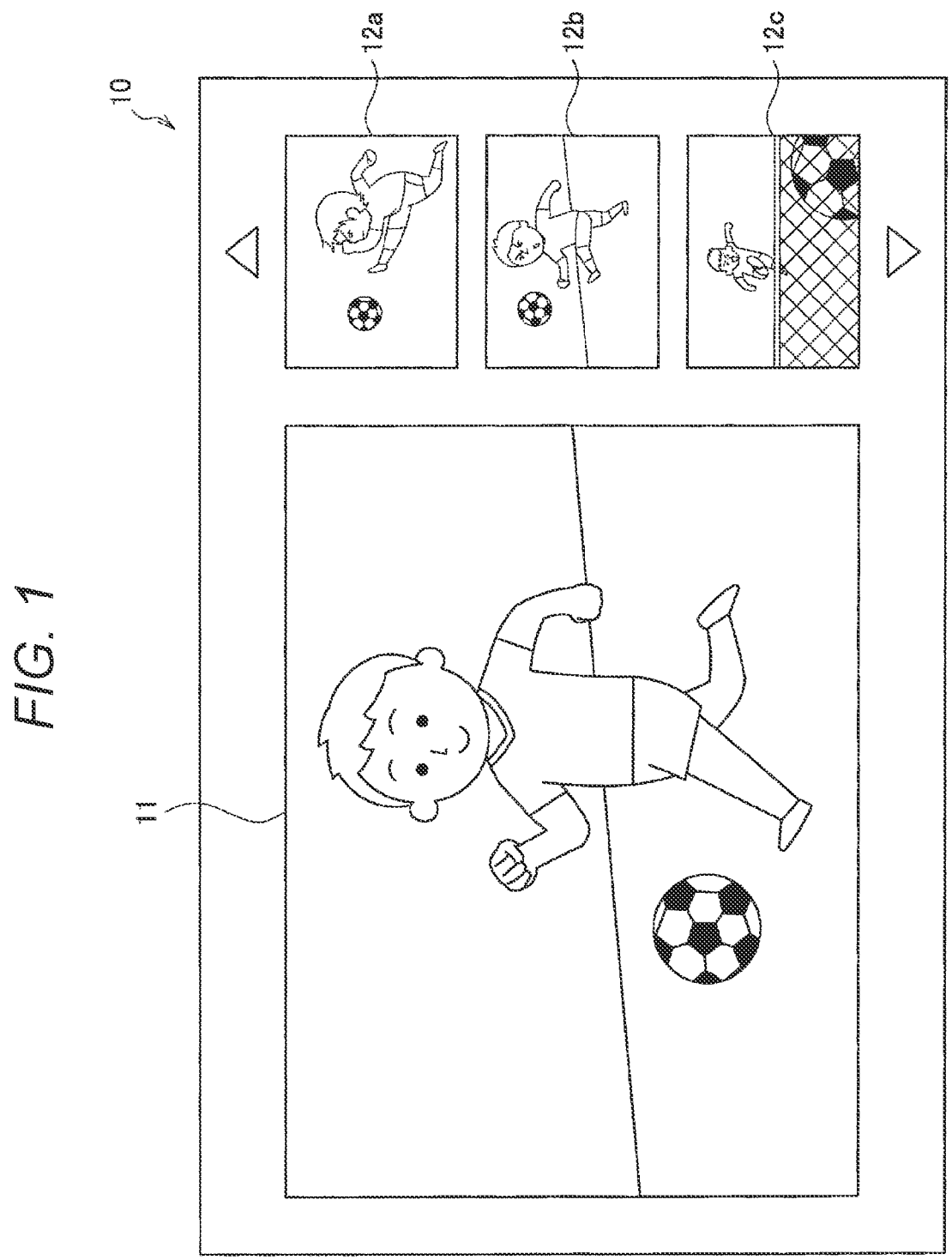
FIG. 1 is a diagram showing a specific example of information presented co a user by an imaging device in a case where an item is "composition".

Hereinafter, a preferred embodiment of the present disclosure will be described in detail with reference to the accompanying drawings. Note that, in the present specification and the drawings, components having substantially the same functional configuration are designated by the same reference numeral, and duplicate description thereof will be omitted.

Note that the description will be given in the following order.

1. Functional overview
2. Configuration example
3. Example of processing flow
4. Function regarding item "retouch"
5. Conclusion p <1. Functional overview First, a functional overview of an imaging device according to an embodiment of the present disclosure will be described.

The imaging device according to the present embodiment includes, and is not necessarily limited to, various cameras (for example, a single-lens reflex camera, a digital camera, a video camera, and the like), and a smartphone, a mobile phone, and the like having an imaging function. More specifically, the imaging device according to the present embodiment is only required to be a device having an imaging function, and can include, for example, an endoscope, a microscope, a drive recorder, and the like. Hereinafter, a case where the imaging device according to the present embodiment is various cameras will be described as an example.

It is not easy for a user (especially a beginner) to image a more attractive picture with a camera. More specifically, the user is required to learn what an attractive picture looks like on the Internet, books, and the like. Moreover, the user is required to learn an operation method of the camera to image a desired picture. In particular, in recent years, cameras equipped with various functions have been developed. However, an operation method is often complicated, and the user often cannot operate the camera properly. Furthermore, even if the user understands the operation method of the camera, each function is often not used because he/she cannot recognize what kind of picture can be imaged by each function.

Although a camera having imaging production assistance functions has been disclosed, depending on the background art including Patent Document 1 as described above, it has not been possible to appropriately assist production of imaging on the basis of a user's proficiency level regarding the imaging.

The discloser of this case has come to create a technique according to the present disclosure in view of the circumstances described above. The imaging device according to the present embodiment determines an item presented to assist imaging on the basis of user's proficiency level information regarding the imaging, and presents item information, which is information regarding the item, to the user. Then, the imaging device according to the present embodiment presents a reference image, which is an image to be used as reference in the imaging, to the user together with item information corresponding to the reference image, or presents the reference image to the user as the item information.

"User's proficiency level information regarding imaging (hereinafter, may be simply referred to as "proficiency level information")" is information indicating user's overall technical ability (skill) in imaging. More specifically, the proficiency level information is information indicating depth of knowledge about imaging itself, skill of operating an imaging device, skill of editing a captured image, and the like of a user (note that the proficiency level information is not limited to these information).

Furthermore, "item presented to assist imaging (hereinafter, may be simply referred to as "item")" includes at least one of an item regarding an image composition, an item regarding imaging processing setting, or an item regarding an accessory used in imaging processing. More specifically, the item includes at least one of "composition", "manual setting", or "accessory". The imaging device according to the present embodiment determines a presented item on the basis of the proficiency level information. For example, in a case where the proficiency level is low, the presented item can be "composition", in a case where the proficiency level is medium, the presented item can be "manual setting", and in a case where the proficiency level is high, the presented item can be "accessory". Note that contents of the item and contents of the item corresponding to the proficiency level are not necessarily limited to these. For example, the item may include "retouch" and the like. A captured image is often retouched by a user in subsequent processing. By including "retouch" in the item, for example, it is possible to assist production during the retouch on a personal computer (PC) or realize imaging in consideration of the retouch. This allows the user to learn not only about imaging but also about a series of steps until a work is completed by the retouch.

"Item information" is information regarding these items, and is information having specific contents such as "composition", "manual setting", or "accessory". For example, in a case where the item is "manual setting", the Them information can be information on set values of shutter speed, an aperture value, ISO sensitivity, exposure, white balance, and the like, and in a case where the item is "accessory", the item information can be information indicating a lens, a filter, a flash, and the like, information indicating features thereof, or information on set values thereof. Furthermore, in a case where the item is "composition", the item information may be information on a position and size of a main subject in a reference image or the reference image itself (a case where information on a position and size of a main subject is not displayed in characters and only the reference image is displayed).

Furthermore, "reference image" is an image corresponding to the item information. More specifically, the reference image according to the item "composition" is an image captured with a composition which is a specific example, the reference image according to the item "manual setting" is an image captured with manual setting which is a specific example, and the reference image according to the item "accessory" is an image captured by using an accessory which is a specific example. As described above, the reference image is assumed to be used as reference in the imaging, and it can be, for example, an image captured by a highly proficient user (for example, a professional photographer and the like), an image with high evaluation, and the like (for example, an image with high evaluation on an SNS and a community site, and the like).

Here, a specific example of a reference image and item information presented to a user by the imaging device according to the present embodiment will be described with reference to FIGS. 1 to 3.

FIG. 1 is a diagram showing a specific example of a reference image and the like presented to the user by the imaging device in a case where the item is "composition". FIG. 1 shows a specific example of an image displayed in a display area 10 of an electric view finder/electronic view finder (EVF), a monitor, and the like of the imaging device (the same applies to FIGS. 2 and 3). As shown in FIG. 1, a live view image 11 (an image generated by using a pixel signal read from an imaging element at a predetermined frame rate) is displayed on a left side of the display area 10, and reference images 12a to 12c regarding the item "composition" are displayed on a right side of the display area 10 (in the example of FIG. 1, the reference images 12a to 12c are presented as the item information). The imaging device according to the present embodiment estimates an imaging scene by analyzing the live view image 11, and presents a reference image on the basis of the scene (the same applies to FIGS. 2 and 3). In the example of FIG. 1, on the basis of the imaging scene being "soccer", the imaging device similarly presents reference images in which "soccer" is used as the imaging scene.

Figure 2:
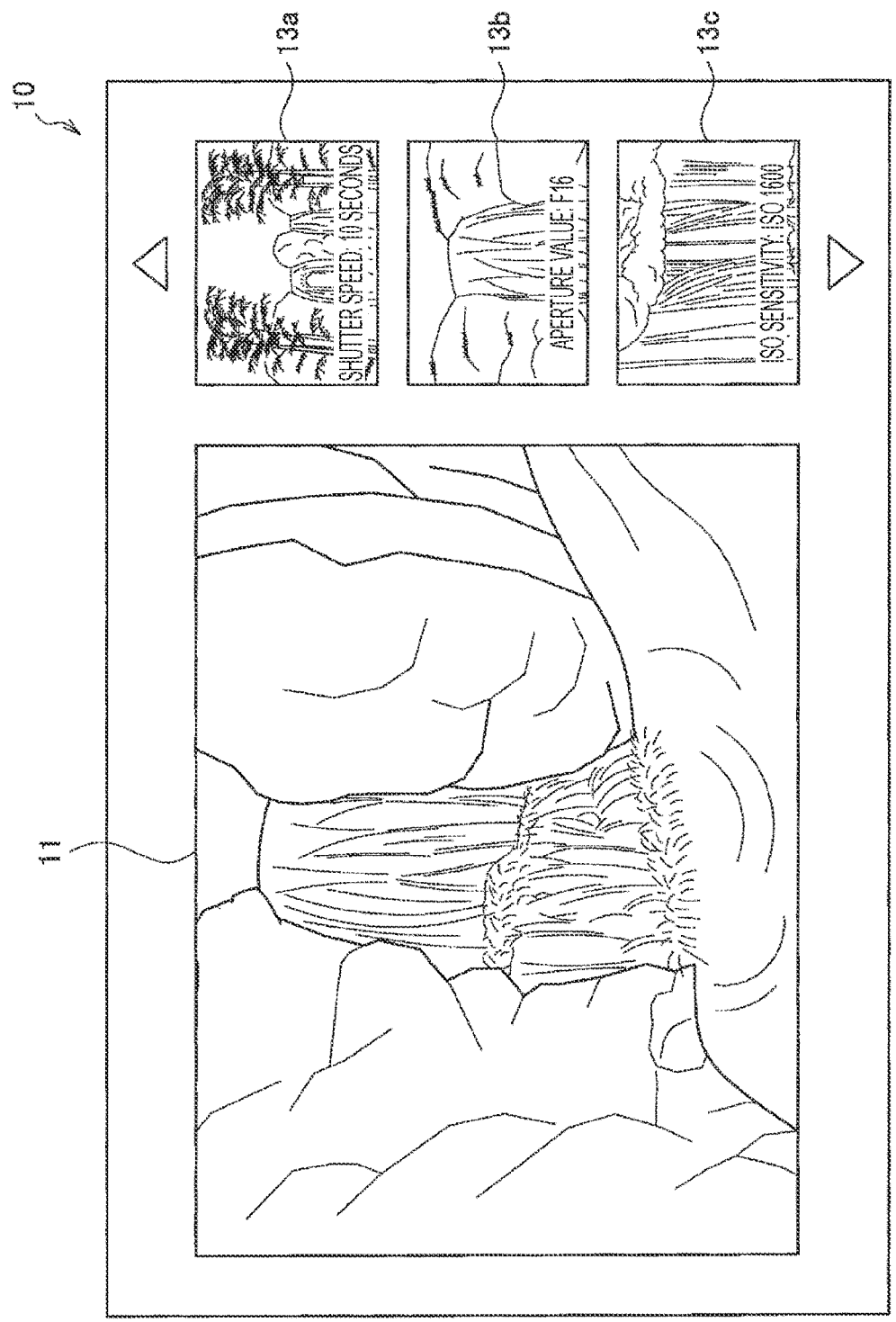
FIG. 2 is a diagram showing a specific example of information presented to a user by the imaging device in a case where the item is "manual setting".

FIG. 2 is a diagram showing a specific example of a reference image and the like presented to the user by the imaging device in a case where the item is "manual setting" (in the example of FIG. 2, reference images in a case where an imaging scene is "waterfall" are shown). As shown in FIG. 2, reference images 13a to 13c regarding the item "manual setting" are displayed on the right side of the display area 10 together with item information (in the example of FIG. 2, "shutter speed: 10 seconds", "aperture value: F16", and "ISO sensitivity: ISO 1600") corresponding to each reference image.

Figure 3:
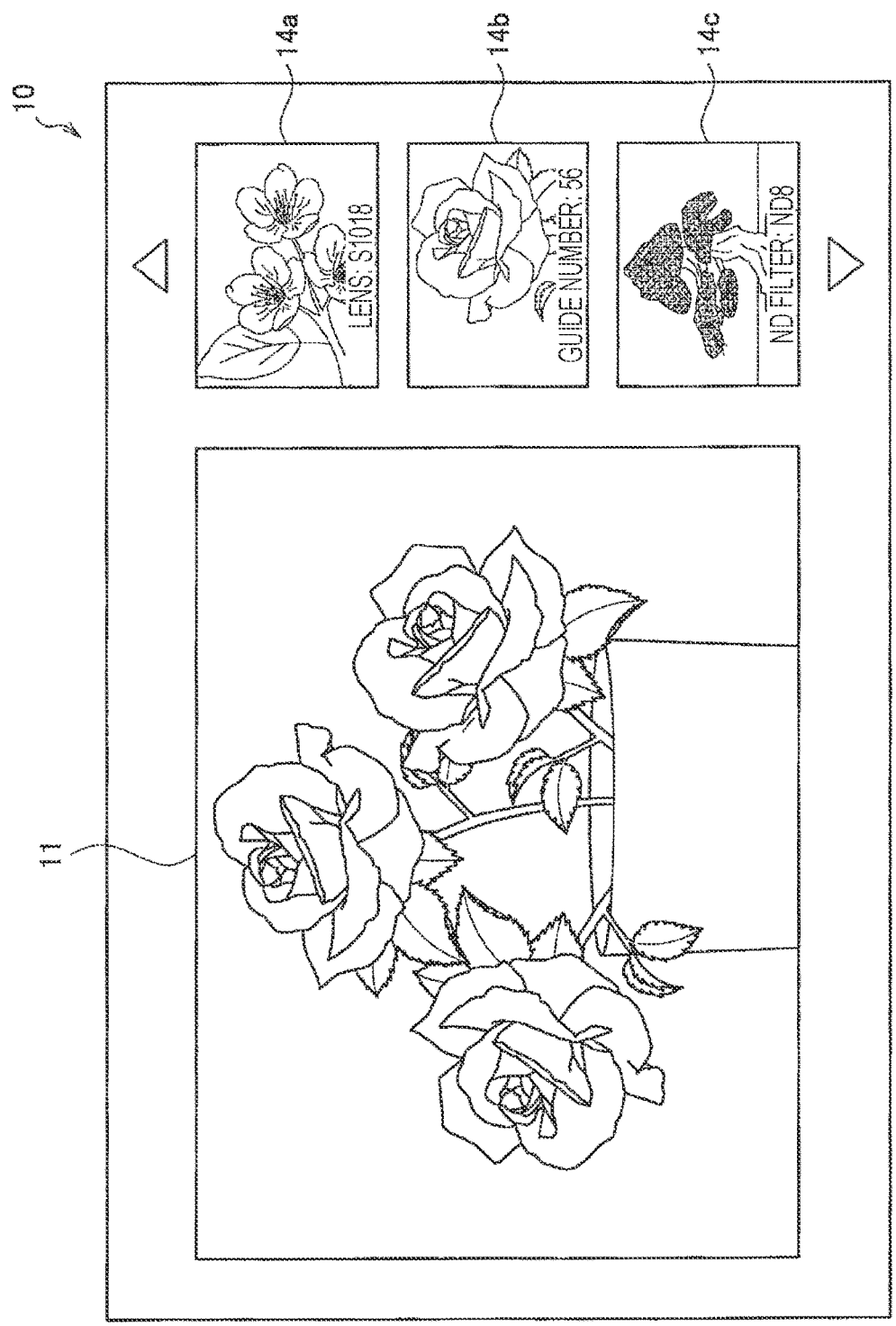
FIG. 3 is a diagram showing a specific example of information presented to a user by the imaging device in a case where the item is "accessory".

FIG. 3 is a diagram showing a specific example of a reference image and the like presented to the user by the imaging device in a case where the item is "accessory" (in the example of FIG. 3, reference images in a case where an imaging scene is "plant" are shown). As shown in FIG. 3, reference images 14a to 14c regarding the item "accessory" are displayed on the right side of the display area 10 together with item information (in the example of FIG. 3, "lens: S1018" (assuming a model number of lens), "guide number: 56", and "ND filter: ND8") corresponding to each reference image.

In this way, the imaging device according to the present embodiment presents the reference image to the user together with the item information corresponding to the reference image, or presents the reference image to the user as the item information, so that it is possible to provide the user with an opportunity to learn an attractive captured image in each imaging scene and also to embody an impression of an image desired by the user. Furthermore, the imaging device according to the present embodiment can dynamically switch the presented items by determining the item presented to the user on the basis of the proficiency level information, and can provide the user with an opportunity to learn how each item affects appearance of a work according to the proficiency level.

Note that contents displayed in the display area 10 are not limited to the examples of FIGS. 1 to 3. For example, the number of reference images displayed in the display area 10 is not particularly limited, and the displayed reference images may be switched by scrolling and the like. Furthermore, layout of the live view image 11 and the reference image in the display area 10 is not particularly limited. Furthermore, the display contents may be appropriately controlled so that the user can concentrate on the presented item. For example, in a case where the item is "composition", the EVF or monitor may be displayed in black and white, or menus regarding other functions (for example, a manual setting function and the like) may be hidden so that the user can concentrate on the composition.

<2. Configuration Example

Figure 4:
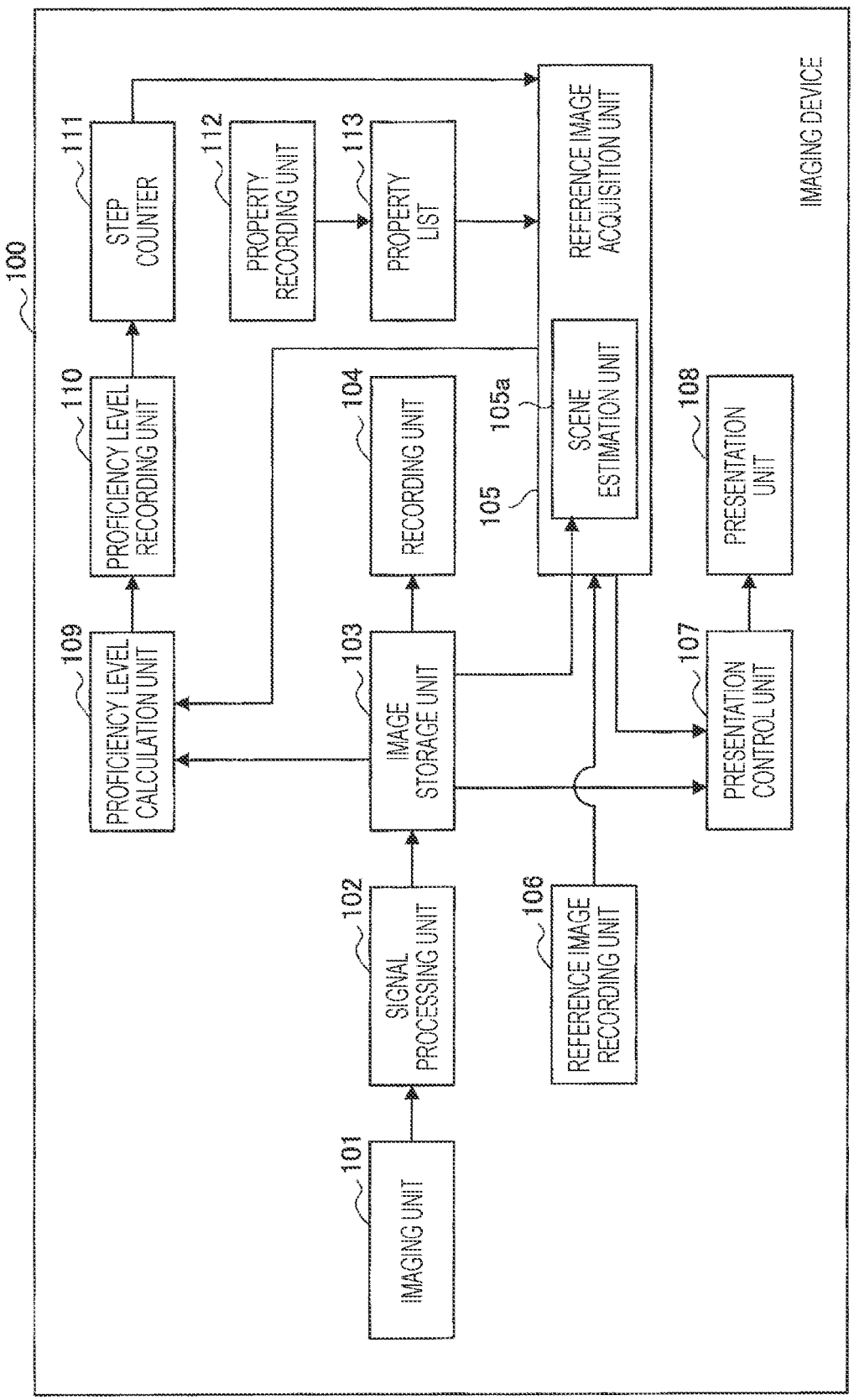
FIG. 4 is a block diagram showing a configuration example of the imaging device according to the present embodiment.

The functional overview of the imaging device according to the present embodiment has been described above. Subsequently, a configuration example of the imaging device according to the present embodiment will be described with reference to FIG. 4. FIG. 4 is a block diagram showing the configuration example of the imaging device according to the present embodiment.

As shown in FIG. 4, an imaging device 100 according to the present embodiment includes an imaging unit 101, a signal processing unit 102, an image storage unit 103, a recording unit 104, a reference image acquisition unit 105, a reference image recording unit 106, a presentation control unit 107, a presentation unit 108, a proficiency level calculation unit 109, a proficiency level recording unit 110, a step counter 111, a property recording unit 112, and a property list 113. Furthermore, the reference image acquisition unit 105 includes a scene estimation unit 105a.

The imaging unit 101 includes a lens group, a shutter, various filters, an imaging element, and the like. The lens group includes, for example, a front lens located closest to a subject side, a focusing lens used to control a focus position of a subject image, a blur correction lens used to correct an image blur of the subject image, and the like. A type and the number of lenses included in the lens group are riot particularly limited. The shutter controls an exposure state of the imaging element by opening and closing an optical path. The various filters are used to transmit only light of a desired wavelength, and can be, for example, an optical low pass filter, an infrared cut filter, and the like. A type of filter is not particularly limited. The imaging element has a configuration in which a plurality of pixels is provided on an image forming surface, and each pixel converts a subject image formed by the lens group into an electrical signal (pixel signal). The imaging element can be, for example, a charge coupled device (CCD) sensor array, a complementary metal oxide semiconductor (CMOS) sensor array, and the like, but is not necessarily limited to these.

The signal processing unit 102 is configured to perform various processing on the pixel signal provided by the imaging element of the imaging unit 101. For example, the signal processing unit 102 performs noise removal, gain adjustment, waveform shaping, A/D conversion, white balance adjustment, brightness adjustment, contrast value adjustment, sharpness (contour enhancement) adjustment, color correction, blur correction, and the like. Note that processing contents of the signal processing unit 102 are not limited to these.

The image storage unit 103 is configured to temporarily store a captured image subjected to the various processing by the signal processing unit 102. The image storage unit 103 can be realized by, for example, various memories and the like, but is not necessarily limited to this.

The recording unit 104 is configured to record a captured image temporarily stored in the image storage unit 103 for a long period of time. The recording unit 104 can be realized by, for example, various hard disks and the like, but is not necessarily limited to this (the same applies to the reference image recording unit 106, the proficiency level recording unit 110, and the property recording unit 112). Note that although FIG. 4 shows a case where the recording unit 104 is provided in the imaging device 100 as an example, the recording unit 104 may be provided outside the imaging device 100 (the same applies to the reference image recording unit 106, the proficiency level recording unit 110, and the property recording unit 112). For example, the recording unit 104 may be realized by an external recording device (for example, a memory card, an external hard disk, and the like) or an external device (for example, an external storage, a cloud server, and the like).

The scene estimation unit 105a is configured to estimate an imaging scene on the basis of a captured image (live view image). More specifically, the scene estimation unit 105a analyzes the captured image to recognize a position, size, and the like of a main subject in the captured image and to recognize contents of the subject, thereby estimating the imaging scene.

Here, the "imaging scene (hereinafter, may be simply referred to as "scene")" is only required to be information indicating an imaging target, situation, and the like. More specifically, the scene can include elements regarding the subject. For example, the scene can include contents of the subject (for example, "landscape", "human", "animal", or in more detail, "mountain", "sea", "child", "old man", "dog", "cat", and the like), behavior of the subject (for example, "soccer", "running", "swimming", "stationary", and the like), a location of the subject (for example, "indoor", "outdoor", "amusement park", and the like), a position (for example, "left side", "near the center", and the like), size (area), or the number (for example, "two people", "three pieces", and the like) of the subject in the captured image.

Furthermore, the scene can include elements regarding the imaging situation. For example, the scene can include imaging environment (for example, weather, time zone, brightness, and the like), an imaging location (for example, "indoor", "outdoor", and the like), or an imaging method (for example, "telephoto", "proximity", and the like). Furthermore, the scene may be a combination of the elements described above. For example, by combining "child", "soccer", "two people", "telephoto", and the like, the imaging scene may be expressed as "scene of two children playing soccer imaged in telephoto". The scene is expressed by combining the plurality of elements in this way, so that more appropriate production assistance can be performed in subsequent processing.

Note that a scene estimation method by the scene estimation unit 105a is not limited to the above. For example, the scene estimation unit 105a may specify a position, orientation, and the like of the imaging device 100 on the basis of sensor data from various sensors (for example, a position sensor, a gyro sensor, and the like, not shown in FIG. 4) provided in the imaging device 100, and estimate the scene in consideration of these information. For example, in a case where the imaging device 100 is located at an imaging spot of a famous landscape, the scene estimation unit 105a may estimate that the scene is a "landscape". As a result, the scene estimation unit 105a can improve estimation accuracy of the scene. Furthermore, a trigger for the scene estimation unit 105a to estimate the imaging scene is not particularly limited. For example, the scene estimation unit 105a may estimate the imaging scene using a predetermined operation such as half-pressing an imaging button, pressing a predetermined button, or touching a touch panel performed by a user as the trigger. After the scene is estimated, production assistance including presentation of a reference image and the like is performed (hence, hereinafter, the operation such as half-pressing the imaging button is also referred to as "production assistance command").

The reference image acquisition unit 105 is configured to acquire a reference image from inside or outside the device on the basis of a captured image (for example, a live view image and the like). More specifically, the reference image acquisition unit 105 uses the captured image to acquire a reference image on the basis of the scene estimated by the scene estimation unit 105a from the reference image recording unit 106 or an external device (for example, a memory card, an external hard disk, a storage, a cloud server, and the like). For example, the reference image acquisition unit 105 acquires a reference image regarding a scene that is the same as or similar to the scene estimated by the scene estimation unit 105a. As a result, a reference image suitable for the imaging target, situation, and the like is presented in the subsequent processing.

A method in which the reference image acquisition unit 105 acquires the reference image on the basis of the scene is not particularly limited. For example, the reference image recording unit 106, which will be described later, may record a plurality of reference images in association with metadata regarding the scene, and the reference image acquisition unit 105 may compare the metadata and the scene estimated by the scene estimation unit 105a to acquire a reference image on the basis of a degree of similarity (or a degree of relevance) to each other. At this time, the reference image acquisition unit 105 can acquire a more appropriate reference image by preferentially acquiring a reference image having a high degree of similarity. Note that a method of determining priority of the reference image is not particularly limited. For example, as an imaging location or imaging time between the captured image and the reference image is closer, or evaluation of a user who captured the reference image or evaluation of the reference image itself is higher, the priority may be higher. Furthermore, in a case where the reference image is captured using an accessory that a user does not own, or in a case where it cannot be captured with performance or function of the imaging device 100, and the like, the priority of the reference image may be lower.

Furthermore, the reference image acquisition unit 105 also acquires item information corresponding to the reference image from the reference image recording unit 106. For example, the reference image acquisition unit 105 acquires information on a position and size of a main subject in the reference image in a case where an item is "composition", information on set values of shutter speed, an aperture value, ISO sensitivity, exposure, white balance, and the like in a case where the item is "manual setting", and information indicating a lens, a filter, a flash, and the like, information indicating features thereof, or information on set values thereof in a case where the item is "accessory". This makes it possible to present the item information to the user together with the reference information.

Here, a user selects a reference image to be referred to from the plurality of reference images acquired by the reference image acquisition unit 105 (note that the reference image does not necessarily have to be selected). As a result, the proficiency level calculation unit 109 can calculate proficiency level information by comparing the captured image and the reference image in the subsequent processing. Note that a method of selecting the reference image by the user is not particularly limited. For example, the user can select a desired reference image from the plurality of reference images by pressing a predetermined button, touching a touch panel, a line-of-sight recognition function, and the like. Furthermore, in a case where the user selects the reference image, manual setting and the like that is the same as or similar to that of the reference image may be automatically performed. This allows the user to more easily capture an image similar to the reference image.

The reference image recording unit 106 is configured to record a reference image and item information corresponding to the reference image. As described above, the reference image is assumed to be an image to be referred to in imaging. For example, in the reference image recording unit 106, an image captured by highly proficient user (for example, a professional photographer and the like), an image captured with high evaluation, and the like are recorded at the time of manufacturing the imaging device 100, and these images are updated at any time via a communication unit (not shown in FIG. 4) capable of communicating with an external device.

The presentation control unit 107 is configured to control information presented to a user by the presentation unit 108. For example, the presentation control unit 107 controls contents, layout, and the like of a live view image, a reference image, item information, and the like displayed on the EVF, the monitor, and the like included in the presentation unit 108. Note that in a case where an acquired reference image is captured using an accessory that the user does not own, or in a case where it cannot be captured with performance or function of the imaging device 100, the presentation control unit 107 may cause the presentation unit 108 to present the reference image in a manner distinguishable from other reference images (for example, grayed out and the like) or to present a predetermined warning. Furthermore, the presentation control unit 107 may cause to present a substitute from accessories owned by the user, to separately present a set value corresponding to the imaging device 100 (for example, an ISO value of a reference image is ISO 50, but in a case where the imaging device 100 corresponds only to ISO 100 or more, ISO 100 presented, and the like), or convert a reference image according to the set value corresponding to the imaging device 100 (for example, if noise of ISO 1600 of an imaging device that has captured a reference image corresponds to ISO 3200 of the imaging device 100 in a scene where noise is important, a reference image obtained by converting the ISO value to ISO 3200 is generated, and the like). Furthermore, in a case where the presentation unit 108 includes a voice our mechanism and the like, the presentation control unit 107 may control contents of voice output presented to the user. The presentation control unit 107 generates control information indicating contents of control, and provides the information to the presentation unit 108.

The presentation unit 108 is configured to present various information to the user on the basis of the control information provided by the presentation control unit 107. For example, as shown in FIGS. 1 to 3, the presentation unit 108 presents a plurality of reference images to the user together with item information corresponding to the reference images (for example, as in FIGS. 2 and 3, a case where the reference images are presented together with the item information regarding the manual setting and accessory), or presents them to the user as the item information (for example, as in FIG. 1, a case where the reference images are presented as the item information). At that time, the presentation unit 108 presents the live view image to the user together with the reference images and the like, as shown in FIGS. 1 to 3, for example. This makes it easier for the user to capture an image while referring to the reference images. As described above, the presentation unit 108 includes a display mechanism such as the EVF, the monitor, and the like, and may include, for example, a voice output mechanism such as a speaker. Note that contents of the presentation unit 108 are not necessarily limited to these.

The proficiency level calculation unit 109 is configured to calculate proficiency level information by comparing a captured image and a reference image. More specifically, the proficiency level calculation unit 109 calculates proficiency level information on the basis of how much the captured image satisfies a point in a case where imaging is performed with reference to the reference image (hereinafter referred to as "imaging point"). The imaging point differs depending on contents of the item. In a case where the item is "composition", the imaging point includes, for example, elements regarding a position and size of a main subject. In a case where the item is "manual setting", the imaging point includes, for example, elements regarding values of shutter speed, an aperture value, ISO sensitivity, exposure, white balance, and the like. In a case where the item is "accessory", the imaging point includes, for example, elements regarding a lens, a filter, a flash, and the like (including information indicating the accessory, information indicating a feature of the accessory, information regarding setting of the accessory, and the like). Note that weighting of each element of the imaging point may be different for each item. For example, in a case where the item is "composition", for example, weight of the elements regarding the position and size of the main subject may be set larger than that of other elements (the same applies to the item "manual setting" and the item "accessory").

The proficiency level calculation unit 109 acquires information on the elements described above serving as the imaging point (hereinafter referred to as "first imaging point information") by analyzing the captured image itself or referring to metadata added to the captured image (for example, exchangeable image file format (Exif) and the like). Furthermore, the proficiency level calculation unit 109 acquires information on elements that is the same as or similar to the first imaging point information (hereinafter referred to as "second imaging point information") by analyzing the reference image acquired by the reference image acquisition unit 105 or referring to the item information also acquired. Then, the proficiency level calculation unit 109 compares the first imaging point information and the second imaging point information, and calculates a degree of similarity to each other and the like (note that the present disclosure is not necessarily limited to the degree of similarity as the proficiency level information.

Furthermore, the proficiency level calculation unit 109 may also calculate the proficiency level information on the basis of an imaging situation. For example, the proficiency level calculation unit 109 may also calculate the proficiency level information on the basis of a probability (or the number of times and the like) of taking a captured image satisfying the above imaging point or time required to take the captured image satisfying the above imaging point (for example, time required from a time when a reference image is selected by the user to a time when the captured image is taken). Therefore, the proficiency level calculation unit 109 can improve accuracy of the proficiency level information.

Note that a method of calculating the proficiency level information by the proficiency level calculation unit 109 is not limited to the above. For example, the proficiency level calculation unit 109 may acquire information corresponding to the user's proficiency level (for example, evaluation of user's work, user's qualification, information on user's career, employment company, and the like) from an external device (for example, a management server of an SNS, a community site, and the like) and calculate the proficiency level information on the basis of these information. Furthermore, the proficiency level calculation unit 109 may have a "proficiency level counter" as proficiency level information and calculate the proficiency level information. For example, if the captured image satisfies the imaging point, the proficiency level counter is added, and if not, the proficiency level counter is subtracted. At this time, a value to be added or subtracted for a more important element of the imaging point may be set larger than that of the other elements. Furthermore, in a case where a more difficult element of the imaging point is satisfied, the value to be added may be set larger than that of the other elements, or in a case where a less difficult element thereof is not satisfied, the value to be subtracted may be set larger than that of the other elements.

The proficiency level recording unit 110 is configured to record proficiency level information. More specifically, after the proficiency level calculation unit 109 calculates the proficiency level information, the proficiency level recording unit 110 receives and records the proficiency level information. Note that, in a case where a plurality of users uses the imaging device 100, the proficiency level recording unit 110 can manage property information for each user. In that case, the user who uses the imaging device 100 is authenticated by a predetermined method (for example, authentication by ID and password, biometric authentication, and the like).

The step counter 111 is configured to manage information used for determining an item presented to assist imaging. More specifically, the step counter Ill calculates a value used to determine the item presented on the basis of the proficiency level information. In a case where the proficiency level information is in numerical format (note that the proficiency level information does not necessarily have to be in the numerical format), for example, the step counter 111 associates a numerical value in one range with a value "1", associates a numerical value in another range with a value "2", associates a numerical value in still another range with a value "3", and the like. Then, for example, if the value is "1", the item "composition" is presented, if the value is "2", the item "manual setting" is presented, if the value is "3", the item "accessory" is presented, and the like. These values are used to determine the items presented. In the present embodiment, the step counter 111 functions as an assistant control unit that determines an item presented to assist imaging on the basis of the user's proficiency level information regarding the imaging (another configuration such as the reference image acquisition unit 105 may also function as the assistant control unit). Note that the step counter 111 may appropriately change a method of associating these values with the proficiency level information (in the above example, the range of the numerical value that is the proficiency level information, and the like). For example, the step counter 111 may change the method of associating these values with the proficiency level information on the basis of magnitude of the numerical value that is the proficiency level information.

The property recording unit 112 is configured to record information regarding property (accessory) of a user who uses the imaging device 100 (hereinafter, referred to as "property information"). Regarding a method of recording to the property recording unit 112, it can be assumed that a case where the user inputs directly to the imaging device 100 itself, a case where input is performed via an external device (for example, a PC, a smartphone, and the like), a case where input is performed by automatic communication cooperation between the imaging device 100 and the accessory, and the like. However, it is not necessarily limited to these methods.

The property list 113 is configured to manage information used when a reference image and the like are acquired on the basis of the property (accessory) of the user. For example, information is set in the property list 113 on the basis of the property information recorded in the property recording unit 112, and the reference image acquisition unit 105 can acquire a reference image and the like from the reference image recording unit 106 on the basis of the information. Note that the information set in the property list 113 can be information extracted from the property information (that is, information after information unnecessary for acquiring the reference image and the like has been removed from the property information) or information in which the property information is highly conceptualized (for example, in a case where the property information includes a product number of a lens, information indicating a type of the lens, and the like). However, the information is not necessarily limited to these.

The configuration example of the imaging device 100 has been described above. Note that the above configuration described with reference to FIG. 4 is merely an example, and the configuration of the imaging device 100 is not limited to such an example. More specifically, the imaging device 100 may not necessarily include all of the configurations shown in FIG. 4, or may include a configuration not shown in FIG. 4. For example, a part of the configuration shown in FIG. 4 may be realized by an external device, and the imaging device 100 may realize various functions by performing communication cooperation with the device.

Furthermore, a part of the configuration shown in FIG. 4 (for example, the scene estimation unit 105a, the reference image acquisition unit 105, the proficiency level calculation unit 109, and the like) may be realized by artificial intelligence (AI) technology or machine learning technique. For example, some functions of the configuration shown in FIG. 4 can be realized by the machine learning technique such as a neural network, a regression model, and the like. More specifically, in a case where a function of the reference image acquisition unit 105 is realized by the machine learning technique, learning can be performed by inputting learning data that links a scene estimated by the scene estimation unit 105a with an acquired reference image and item information to a predetermined calculation model using a neural network or a regression model, and the function of the reference image acquisition unit 105 can be realized by a processing circuit in which a processing model having generated parameters is implemented.

<3. Example of Processing Flow

In the above, the configuration example of the imaging device 100 according to the present embodiment has been described. Subsequently, an example of a processing flow of the imaging device 100 will be described.

(3.1. Example of Processing Flow of Entire Imaging Processing)

Figure 5:
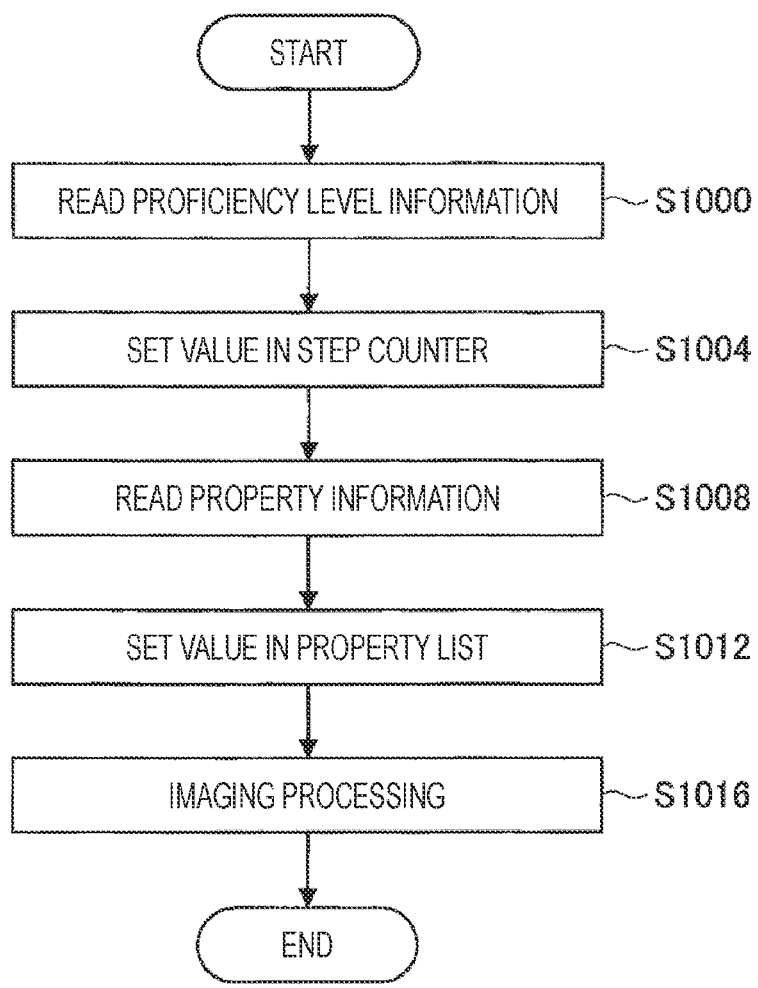
FIG. 5 is a flowchart showing an example of a processing flow of entire imaging processing by the imaging device according to the present embodiment.

First, an example of a processing flow of entire imaging processing by the imaging device 100 will be described with reference to FIG. 5. FIG. 5 is a flowchart showing the example of the processing flow of the entire imaging processing by the imaging device 100.

For example, in a case where a user turns on power of the imaging device 100 using an operation input unit (not shown in FIG. 4), proficiency level information recorded in the proficiency level recording unit 110 is read in step S1000, and a value is set in the step counter 111 on the basis of the read proficiency level information in step S1004. Property information recorded in the property recording unit 112 is read in step S1008, and a value is set in the property list 113 on the basis of the read property information in step S1012. Then, the imaging processing is performed in step S1016, so that the entire imaging processing is completed.

(3.2 Example of Processing Flow of Imaging Processing)

Figure 6:
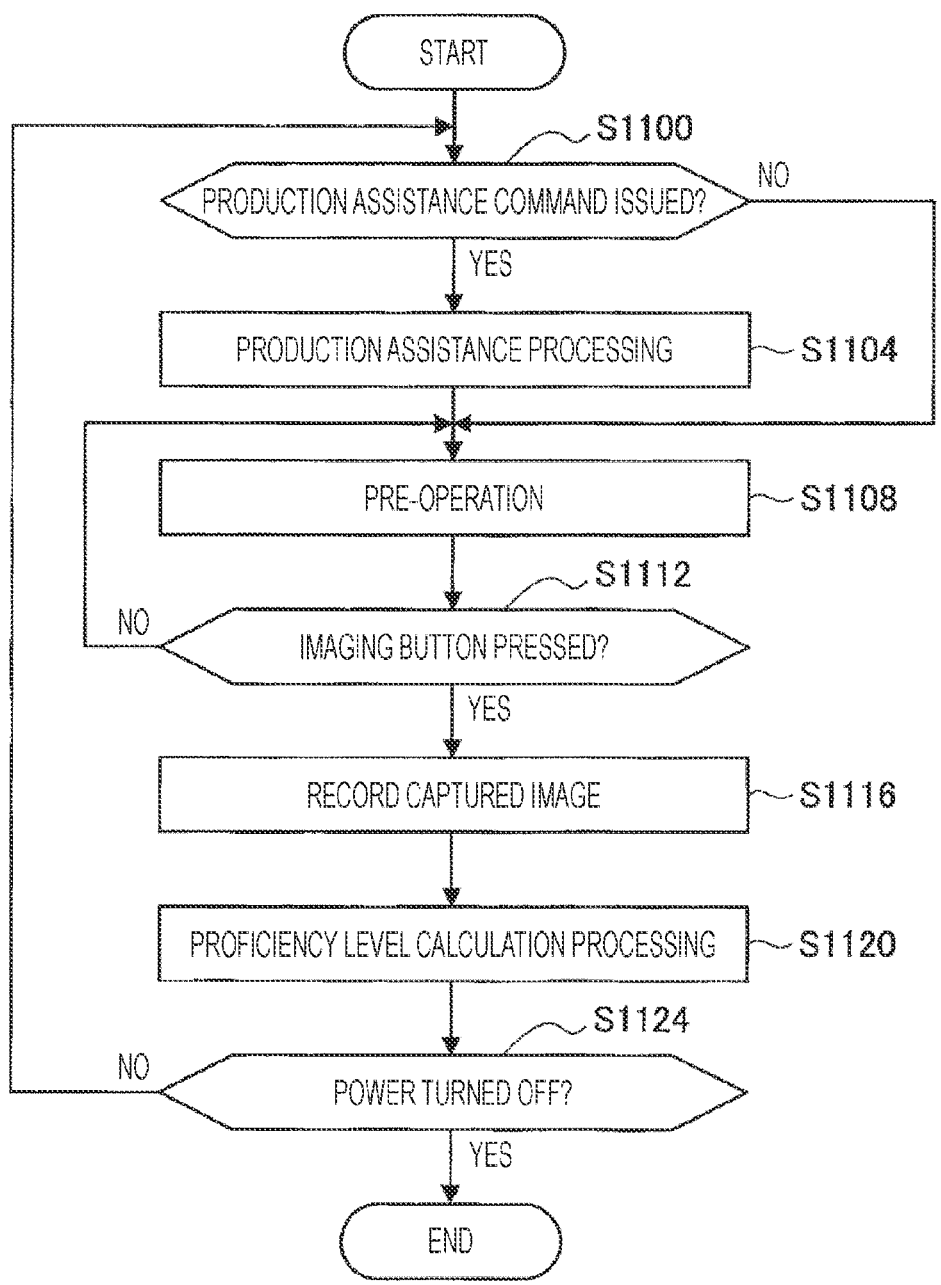
FIG. 6 is a flowchart showing an example of a processing flow of imaging processing performed in step S1016 of FIG. 5.

Subsequently, an example of a processing flow showing the imaging processing performed in step S1016 of FIG. 5 in more detail will be described with reference to FIG. 6. FIG. 6 is a flowchart showing the example of the processing Flow of the imaging processing performed in step S1016 of FIG. 5.

In step S1100, it is determined whether or not a production assistance command has been issued by the user. For example, it is determined whether or not the user has performed an operation such as half-pressing the imaging button. In a case where the production assistance command has been issued by the user (step S1100/Yes), production assistance processing is performed in step S1104. For example, as shown in FIGS. 1 to 3, reference images and item information are presented. Details of the production assistance processing will be described later. In a case where the production assistance command has not been issued by the user (step S1100/No), the processing in step S1104 is omitted.

In step S1108, a pre-operation for imaging is performed. For example, the user attaches an accessory to the imaging device 100, makes manual setting, and selects a desired reference image from a plurality of reference images. Note that contents of the pre-operation are not limited to these. In step S1112, it is determined whether or not the imaging button has been pressed by the user. In a case where the imaging button has been pressed by the user (step S1112/Yes), a captured image is recorded in step S1116. More specifically, each pixel in an imaging element of the imaging unit 101 converts a subject image into a pixel signal, and the signal processing unit 102 performs various processing on the pixel signal, so that a captured image is generated and stored in the image storage unit 103. Thereafter, the recording unit 104 receives and records the captured image from the image storage unit 103.

In step S1120, calculation processing of user's proficiency level regarding imaging is performed. Details of the proficiency level calculation processing will be described later. Note that the example of FIG. 6 shows that the proficiency level is calculated each time the imaging button is pressed and imaging is performed, but the present disclosure is not necessarily limited to this. For example, the proficiency level may be performed every predetermined number of times of imaging or every predetermined period. Then, in a case where the power of the imaging device 100 is turned off by the user (step S1124/Yes), a series of imaging processing is completed. In a case where the power of the imaging device 100 is not turned off by the user (step S1124/No), the process returns to step S1100, and the production assistance processing, the recording of the captured image, and the like are continuously performed.

(3.3. Example of Processing Flow of Production Assistance Processing)

Figure 7:
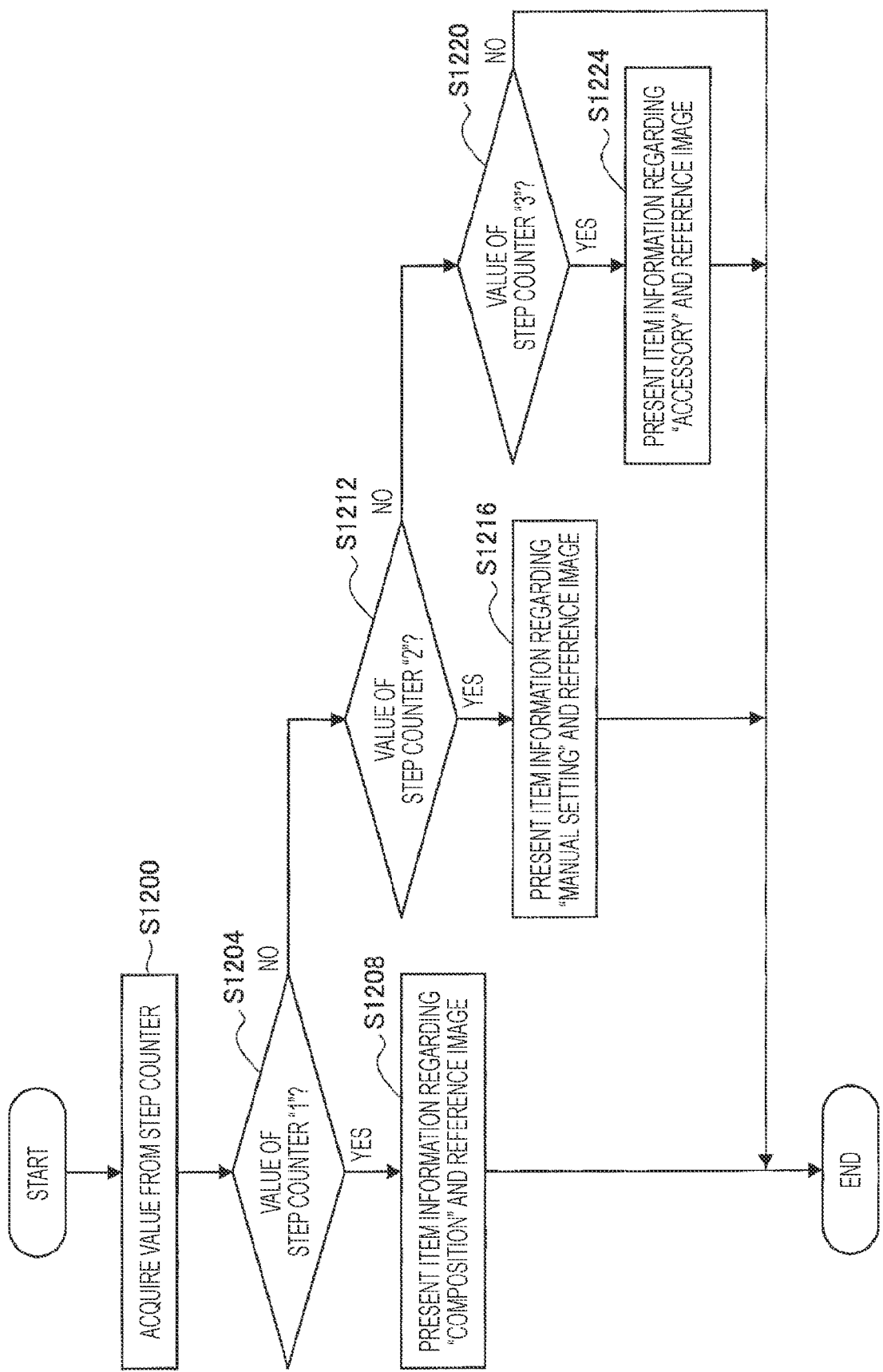
FIG. 7 is a flowchart showing an example of a processing flow of production assistance processing performed in step S1104 of FIG. 6.

Subsequently, an example of a processing flow showing the production assistance processing performed in step S1104 of FIG. 6 in more detail will be described with reference to FIG. 7. FIG. 7 is a flowchart showing the example of the processing flow of the production assistance processing performed in step S1104 of FIG. 6.

In step S1200, the reference image acquisition unit 105 acquires a value from the step counter 111. For example, in a case where the value of the step counter 111 is "1" (step S1204/Yes), item information regarding an item "composition" and a reference image are presented in step S1208, so that a series of production assistance processing is completed. Details of item information and reference image presentation processing will be described later (the same applies to steps S1216 and S1224).

In a case where the value of the step counter 111 is "2" (step S1204/No and step S1212/Yes) item information regarding an item "manual setting" and a reference image are presented in step S1216, so that a series of production assistance processing is completed.

In a case where the value of the step counter 111 is "3" (step S1212/No and step S1220/Yes), item information regarding an item "accessory" and a reference image are presented in step S1224, so that a series of production assistance processing is completed. In a case where the value of the step counter 111 is not "1" to "3" (step S1220/No), item information and a reference image for assisting the production are not presented. Note that the value of the step counter 111 used for the production assistance processing is not limited to the above.

(3.4. Example of Processing Flow of Item Information and Reference Image Presenting Processing)

Figure 8:
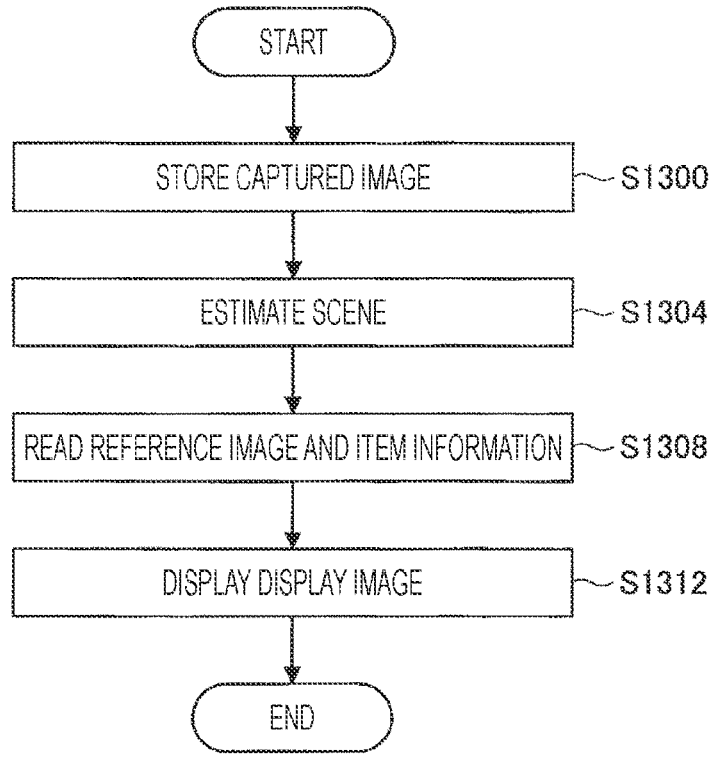
FIG. 8 is a flowchart showing an example of a processing flow of item information and reference image presentation processing performed in steps S1208, S1216, and S1224 of FIG. 7.

Subsequently, an example of a processing flow showing in more detail the item information and reference image presentation processing performed in steps S1208, S1216, and S1224 of FIG. 7 will be described with reference to FIG. 8. FIG. 8 is a flowchart showing the example of the processing flow of the item information and reference image presentation processing performed in steps S1208, S1216, and S1224 of FIG. 7.

In step S1300, a captured image (live view image) is stored in the image storage unit 103. More specifically, each pixel in the imaging element of the imaging unit 101 converts a subject image into a pixel signal, and the signal processing unit 102 performs various processing on the pixel signal, so that a captured image is generated and stored in the image storage unit 103.

In step S1304, the scene estimation unit 105a estimates an imaging scene on the basis of the captured image (live view image). More specifically, the scene estimation unit 105a analyzes the captured image to recognize a position, size, and the like of a main subject in the captured image and to recognize contents of the subject, thereby estimating the imaging scene. In step S1308, the reference image acquisition unit 105 reads a reference image and item information from the reference image recording unit 106 on the basis of the estimated scene and the like. More specifically, the reference image acquisition unit 105 compares the scene estimated by the scene estimation unit 105a with metadata of a reference image recorded in the reference image recording unit 106, thereby acquiring a reference image on the basis of a degree of similarity (or a degree of relevance) to each other. Note that, as described above, the scene estimation unit 105a, the reference image acquisition unit 105, and the like may be realized by artificial intelligence technology or machine learning technique. In step S1312, a display image is displayed. More specifically, the presentation control unit 107 generates a display image using the live view image and the reference image (reference image having a high priority), and the presentation unit 108 displays the image.

At this time, in a case where the item is "composition", the reference images are displayed as the item information as shown in FIG. 1 (note that the item information is not necessarily displayed, but it includes information regarding a position and size of a main subject in the reference image). Furthermore, in a case where the item is "manual setting", as shown in FIG. 2, information on set values of, for example, shutter speed, an aperture value, ISO sensitivity, exposure, white balance, and the like is displayed as the item information together with the reference images. Furthermore, in a case where the item is "accessory", as shown in FIG. 3, information indicating, for example, a lens, a filter, a flash, and the like, information indicating features thereof, or information on set values thereof are displayed as the item information together with the reference images. With the above, the item information and reference image presentation processing is completed.

(3.5. Example of Processing Flow of Proficiency Level Calculation Processing)

Figure 9:
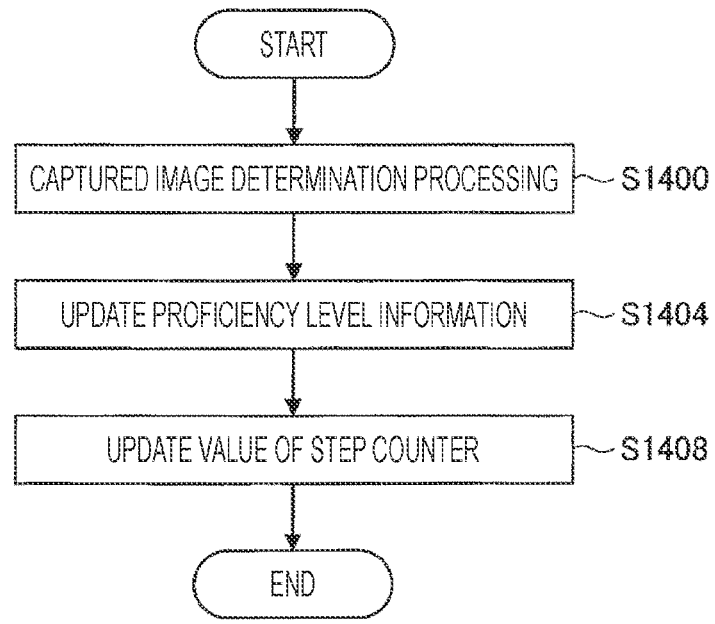
FIG. 9 is a flowchart showing an example of a processing flow of proficiency level calculation processing performed in step S1120 of FIG. 6.

Subsequently, an example of a processing flow showing the proficiency level calculation processing performed in step S1120 of FIG. 6 in more detail will be described with reference to FIG. 9. FIG. 9 is a flowchart showing the example of the proficiency level calculation processing performed in step S1120 of FIG. 6.

In step S1400, the proficiency level calculation unit 109 performs captured image determination processing. More specifically, the proficiency level calculation unit 109 determines how much a captured image satisfies an imaging point of a reference image on the basis of item information provided by the reference image acquisition unit 105. In a case where the item is "composition", the imaging point includes, for example, elements regarding a position and size of a main subject. In a case where the item is "manual setting", the imaging point includes, for example, elements regarding set values of shutter speed, an aperture value, ISO sensitivity, exposure, white balance, and the like. In a case where the item is "accessory", the imaging point includes, for example, elements regarding a lens, a filter, a flash, and the like (including information indicating the accessory, information indicating a feature of the accessory, information on a set value of the accessory, and the like).

In step S1404, the proficiency level calculation unit 109 updates proficiency level information on the basis of a determination result in step S1400, and records the proficiency level information in the proficiency level recording unit 110. In step S1408, a value of the step counter 111 is appropriately updated on the basis of the proficiency level information and the like, and the proficiency level calculation processing ends.

Note that each step in the flowcharts of FIGS. 5 to 9 does not necessarily have to be processed chronologically in the described order. In other words, each step in the flowchart may be processed in an order different from the described order, or may be processed in parallel.

<4. Function Regarding Item "Retouch">

In the above, the example of the processing flow of the imaging device 100 has been described. Next, a function regarding an item "retouch" will be described.

As described above, the item presented to assist imaging may include "retouch" as well as "composition", "manual setting", "accessory", and the like. Here, "retouch" means editing a captured image (including, for example, entire processing that affects appearance of the captured image, such as changing brightness, contrast, or color tone of the captured image, enlarging, reducing, clipping, or rotating the captured image, and the like). Note that a device for performing the retouch is not particularly limited. For example, the retouch can be performed by the imaging device 100 or various external devices (for example, a PC, a smartphone, a dedicated device, and the like). In the following, a case where the retouch is performed by the PC will be described as an example.

In a case where the item presented to assist the imaging is "retouch", the reference image recording unit 106 records a reference image after the retouch and item information including specific contents of the retouch applied to the reference image (for example, information regarding an area, a subject, and the like in the retouched reference image can be included). Note that the item information is not limited to the specific contents of the retouch applied to the reference image, and may include other information (for example, information regarding a composition, manual setting, an accessory, and the like). The reference image acquisition unit 105 acquires the reference image and the item information from the reference image recording unit 106 on the basis of a scene estimated by the scene estimation unit 105a. Then, the presentation control unit 107 causes the presentation unit 108 to present these information. For example, the presentation control unit 107 causes an EVF, a monitor, and the like serving as the presentation unit 108 to display the reference image (after the retouch) or the item information. Note that it is more desirable that the presentation control unit 107 causes the presentation unit 108 to present only information that a user should recognize at the time of imaging. In other words, it is more desirable that the presentation control unit 107 does not cause the presentation unit 108 to present information regarding retouch work (for example, information regarding an instruction of the retouch work) performed after the imaging (using the PC and the like). As a result, unnecessary information is eliminated at the time of imaging, so that the user can concentrate on the imaging.

After the image is captured, the captured image is provided to the PC performing retouch. For example, the captured image is provided to the PC by communication cooperation from the imaging device 100, an external storage medium, and the like. At this time, among the item information, information that the user should recognize at the time of retouch work (hereinafter referred to as "retouch information"), such as specific contents of the retouch (for example, information regarding an area, a subject, and the like in the captured image to be retouched can be included), is associated with the captured image. A method of associating the retouch information with the captured image is not particularly limited. For example, the association may be performed by storing the retouch information in metadata of the captured image. Furthermore, the association may be performed by storing identification information (for example, ID and the like) of the retouch information in the metadata of the captured image, and the retouch information may be recorded in an external device (for example, a cloud server and the like). As a result, the PC performing the retouch can acquire the retouch information from the external device on the basis of the identification information of the retouch information. Then, at the time of the retouch work, the PC urges (instructs) the user to perform appropriate retouch work by presenting the retouch information to the user together with the captured image.

Thereafter, the proficiency level calculation processing described above (see, for example, step S11240 in FIG. 6 and FIG. 9) is performed using the retouched captured image. For example, by providing a configuration corresponding to the proficiency level calculation unit 109 in the PC that has performed the retouch, the PC may calculate a proficiency level by comparing the captured image after the retouch and the reference image, and the like. Furthermore, by providing the configuration corresponding to the proficiency level calculation unit 109 in a server and the like that manages an SNS site and providing the captured image after the retouch to the server, the server may calculate a proficiency level by comparing the captured image after the retouch and the reference image, and the like. The calculated proficiency level is provided to the imaging device 100 and can be used for determining a presentation item.

In recent years, it is not uncommon for a captured image to be retouched. Furthermore, since appearance of the captured image is affected by quality of retouch, by realizing the above-mentioned function regarding the retouch, a user can learn not only about imaging but also about a series of steps until a work is completed by the retouch, and can properly retouch the captured image.

<5. Conclusion>

As described above, the imaging device 100 according to the present embodiment determines an item presented to assist imaging on the basis of user's proficiency level information regarding the imaging, and presents item information, which is information regarding the item, to the user. Then, the imaging device 100 presents a reference image, which is an image to be used as a reference in the imaging, to the user together with the item information corresponding to the reference image, or presents the reference image to the user as the item information.

As a result, the imaging device 100 can provide the user with an opportunity to learn an attractive captured image in each scene of imaging and can also embody an impression of the captured image desired by the user. Furthermore, the imaging device 100 can dynamically switch the items to be presented by determining the item presented to the user on the basis of the proficiency level information, and can provide the user with an opportunity to learn how each item affects appearance of the work according to the proficiency level.

The preferred embodiments of the present disclosure have been described above in detail with reference to the accompanying drawings, but the technical scope of the present disclosure is not limited to such examples. It is obvious that a person having ordinary knowledge in the technical field of the present disclosure can come up with various changes or modifications within the scope of the technical idea described in the claims, and it is understood that the above also naturally belongs to the technical scope of the present disclosure.

For example, although the above embodiment has been described mainly using the still image, the present disclosure is also applicable to a moving image. In a case where the present disclosure is applied to the moving image, an item presented to a user can include elements related to creation of the moving image, such as "camera blocking".

Furthermore, the effects described in the present specification are merely explanatory or exemplifying ones, and are not limiting. In other words, the technology according to the present disclosure can exert other effects that are apparent to those skilled in the art from the description of the present specification, in addition to or instead of the above effects.

Note that the following configurations also belong to the technical scope of the present disclosure.

(1)
An imaging device including:
an assistant control unit that determines, on the basis of user's proficiency level information regarding imaging, an item presented to assist the imaging; and
a presentation unit that presents item information, which is information regarding the item, to the user.

(2)
The imaging device according to (1) above, in which
the presentation unit presents a reference image, which is an image to be used as reference in the imaging, to the user together with the item information corresponding to the reference image, or presents the reference image to the user as the item information.

(3)
The imaging device according to (2) above, in which
the presentation unit presents a plurality of the reference images to the user together with the item information corresponding to the reference images, or presents the reference images to the user as the item information.

(4)
The imaging device according to (2) or (3) above, in which
the presentation unit presents a live view image to the user together with the reference image.

(5)
The imaging device according to (4) above, further including
a reference image acquisition unit that acquires the reference image from inside or outside the device on the basis of the live view image.

(6)
The imaging device according to (5) above, in which
the reference image acquisition unit includes a scene estimation unit that estimates a scene of the imaging on the basis of the live view image, and the reference image is acquired from inside or outside the device on the basis of the scene estimated by the scene estimation unit.

(7)
The imaging device according to any one of (2) to (6) above, further including
a proficiency level calculation unit that calculates the proficiency level information by comparing a captured image and the reference image.

(8)
The imaging device according to (7) above, in which
the proficiency level calculation unit also calculates the proficiency level information on the basis of a situation of the imaging.

(9)
The imaging device according to any one of (1) to (8) above, in which
the item includes at least one of an item regarding an image composition, an item regarding imaging processing setting, or an item regarding an accessory used in imaging processing.

(10)
An imaging method executed by a computer, including:
determining, on the basis of user's proficiency level information regarding imaging, an item presented to assist the imaging; and
presenting item information, which is information regarding the item, to the user.

(11)
A program that allows a computer to execute:
on the basis of user's proficiency level information regarding imaging, determination of an item presented to assist the imaging; and
presentation of item information, which is information regarding the item, to the user.

REFERENCE SIGNS LIST

100 Imaging device
101 Imaging unit
102 Signal processing unit
103 Image storage unit
104 Recording unit
105 Reference image acquisition unit
105a Scene estimation unit
106 Reference image recording unit
107 Presentation control unit
108 Presentation unit
109 Proficiency level calculation unit
110 Proficiency level recording' unit
111 Step counter
112 Property recording unit
113 Property list

The invention claimed is:

1. An imaging device comprising:
assistant control circuitry configured to determine, on a basis of user proficiency level information regarding imaging, the user proficiency level information corresponding to a user of the imaging device, an item presented to assist the imaging, and control display contents of the imaging device according to the user proficiency level information;
presentation circuitry configured to
present item information, which is information regarding the item, to the user, and
present a reference image, which is an image to be used as reference in the imaging, to the user together with the item information corresponding to the reference image, or present the reference image to the user as the item information; and proficiency level calculation circuitry configured to determine the proficiency level information by comparing a captured image and the reference image.

2. The imaging device according to claim 1, wherein the presentation circuitry is further configured to present a plurality of the reference images to the user together with the item information corresponding to the reference image, or present the reference images to the user as the item information.

3. The imaging device according to claim 1, wherein the presentation circuitry is further configured to present a live view image to the user together with the reference image.

4. The imaging device according to claim 3, further comprising
reference image acquisition circuitry configured to acquire the reference image from inside or outside the device on a basis of the live view image.

5. The imaging device according to claim 4, wherein
the reference image acquisition circuitry includes scene estimation circuitry configured to estimate a scene of the imaging on a basis of the live view image, and
the reference image is acquired from inside or outside the device on a basis of the scene estimated by the scene estimation circuitry.

6. The imaging device according to claim 1, wherein the proficiency level calculation circuitry is further configured to determine the proficiency level information on a basis of a situation of the imaging.

7. The imaging device according to claim 1, wherein the item includes at least one of an item regarding an image composition, an item regarding imaging processing setting, or an item regarding an accessory used in imaging processing.

8. The imaging device of claim 1, wherein
the user proficiency level information is a determined user proficiency level identified from a plurality of user proficiency levels, the determined user proficiency level being based upon characteristic information corresponding to the user of the imaging device.

9. An imaging method executed by a computer, comprising:

determining, on a basis of user proficiency level information regarding imaging, an item presented to assist the imaging;
controlling display contents of the imaging device according to the user's proficiency level;
presenting item information, which is information regarding the item, to the user;
presenting a reference image, which is an image to be used as reference in the imaging, to the user together with the item information corresponding to the reference image, or present the reference image to the user as the item information; and
determining the proficiency level information by comparing a captured image and the reference image.

10. A non-transitory computer readable medium storing a program, the program being executable by a computer to perform operations comprising:
determining, on a basis of user proficiency level information regarding imaging, an item presented to assist the imaging;
controlling of display contents of the imaging device according to the user's proficiency level; and
presenting item information, which is information regarding the item, to the user;
presenting a reference image, which is an image to be used as reference in the imaging, to the user together with the item information corresponding to the reference image, or present the reference image to the user as the item information; and
determining the proficiency level information by comparing a captured image and the reference image.

11. The method of claim 9, wherein
the user proficiency level information is a determined user proficiency level identified from a plurality of user proficiency levels, the determined user proficiency level being based upon characteristic information corresponding to the user of the imaging device.

12. The non-transitory computer readable medium of claim 10, wherein
the user proficiency level information is a determined user proficiency level identified from a plurality of user proficiency levels, the determined user proficiency level being based upon characteristic information corresponding to the user of the imaging device.

* * * * *